June 3, 1941.  F. J. CHANDLER  2,244,550

PERFORATING METHOD AND APPARATUS

Filed March 11, 1940   2 Sheets-Sheet 1

Inventor:
Frank Jermain Chandler
By Eugene M. Giles
Atty.

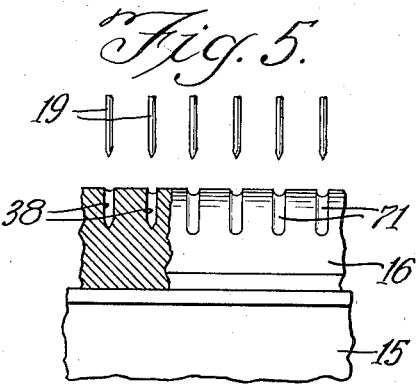
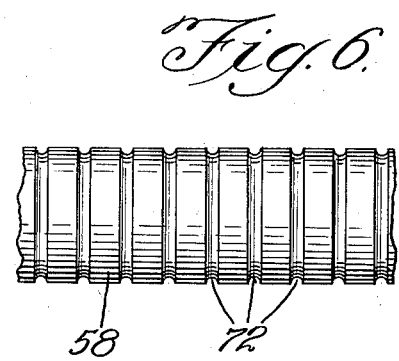
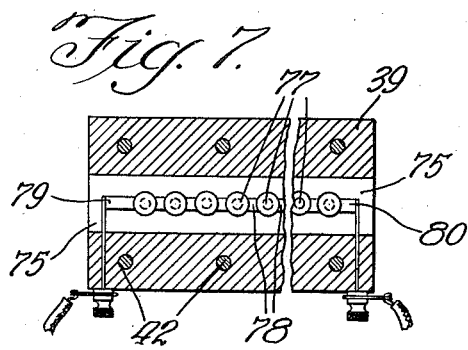
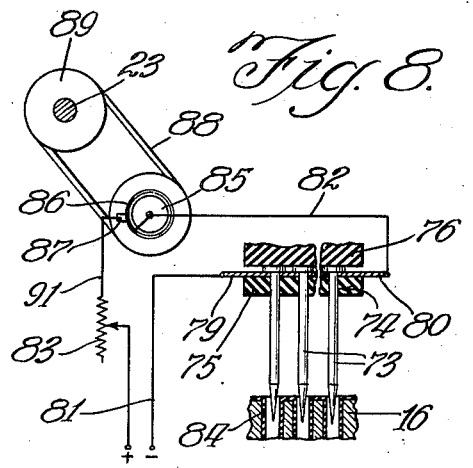
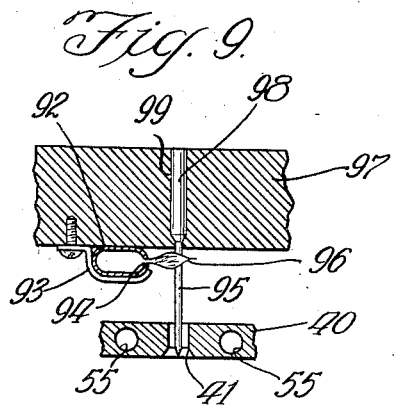
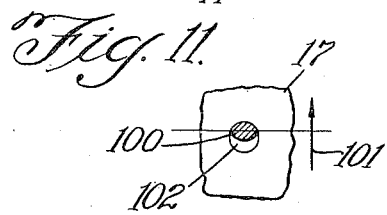

Patented June 3, 1941

2,244,550

UNITED STATES PATENT OFFICE 2,244,550

PERFORATING METHOD AND APPARATUS

Frank Jermain Chandler, Toledo, Ohio

Application March 11, 1940, Serial No. 323,313

10 Claims. (Cl. 164—90)

My invention relates to the perforating of sheet materials composed partly or wholly of rubber or the like, and has reference more particularly to a method of and machine for puncturing with sufficient localized heat at the puncture place to facilitate penetration and preserve the perforation.

In many cases, for example when used for clothing or upholstering, it is desirable to provide sheet rubber, rubber coated fabrics, laminated rubber and fabric sheets or other similar materials with tiny openings therethrough for ventilation or "breathing" as it is commonly called, and because of the elasticity and subsequent processing of the rubber it is difficult to provide satisfactory perforations which are sufficiently small to be reasonably inconspicuous and which are nevertheless sufficiently permanent to be preserved in the final product. Materials composed of or including rubber are preferably perforated before the rubber is cured and softening of the rubber which occurs in the subsequent curing naturally tends to impair and eliminate the openings.

The principal objects of my invention are to provide an improved method and apparatus whereby sheet rubber, fabrics laminated or coated with rubber, or other similar materials may be made with tiny openings therethrough suitable for ventilation or "breathing"; to form the openings so that they extend completely through the sheet material; to insure uniformity and permanence of the openings; to avoid impairment or elimination of the openings in subsequent processing of the sheet material; to permit provision of such perforations in any fabric layers of the sheet material without mutilation or injury to the fabric; and to permit the producing of such openings in plastic pattern surfaced sheets without marring or defacing the pattern surface thereof, these and other objects being accomplished as pointed out hereinafter and as shown in the accompanying drawings in which:

Fig. 5 is a fragmentary side view, partly in section of the die plate;

Fig. 6 is a fragmentary side view of one of the feed rolls for advancing the sheet material through the machine;

Fig. 7 is a view similar to Fig. 3 showing a modified needle heating arrangement;

Fig. 8 is a detail section of the Fig. 7 structure with diagrammatic representation of a controller which may be employed for intermittently heating the needles;

Fig. 9 is a detail sectional view somewhat similar to that of Fig. 4, showing another manner of heating the needles;

Fig. 10 is an enlarged fragmentary sectional view illustrative of material prepared with tiny openings or breathing pores in accordance with this invention; and Fig. 11 is a detail view showing a modified form of needles that may be employed.

In the accompanying drawings which show a preferred embodiment of the invention, a machine is disclosed comprising an elongated needle carrier which is vertically reciprocable to and from a work support over which the sheet material to be perforated is periodically advanced, the needle carrier being provided with a row of depending sharp pointed heated needles which on each downward stroke of the needle carrier penetrate clear through the sheet material on the work support and form a row of tiny openings or breathing pores across the width thereof, the sheet material being advanced a predetermined distance as the needle carrier is raised so that the repetitive operation of the needle carrier forms succeeding spaced rows of tiny openings or breathing pores throughout the length of the sheet material.

Figure 1:
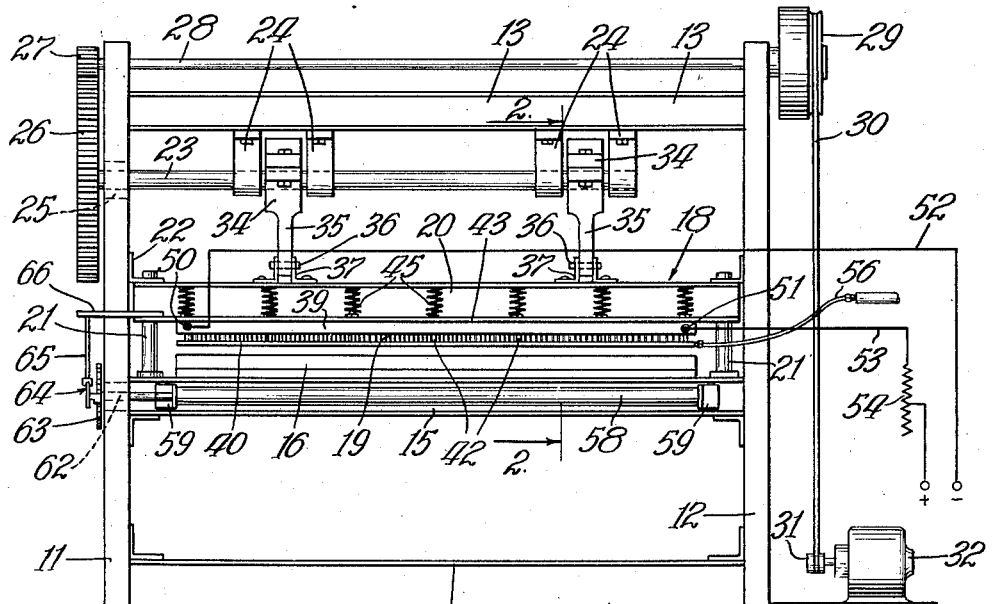
Fig. 1 is a view of the delivery side of a perforating machine made in accordance with this invention.
Figure 2:
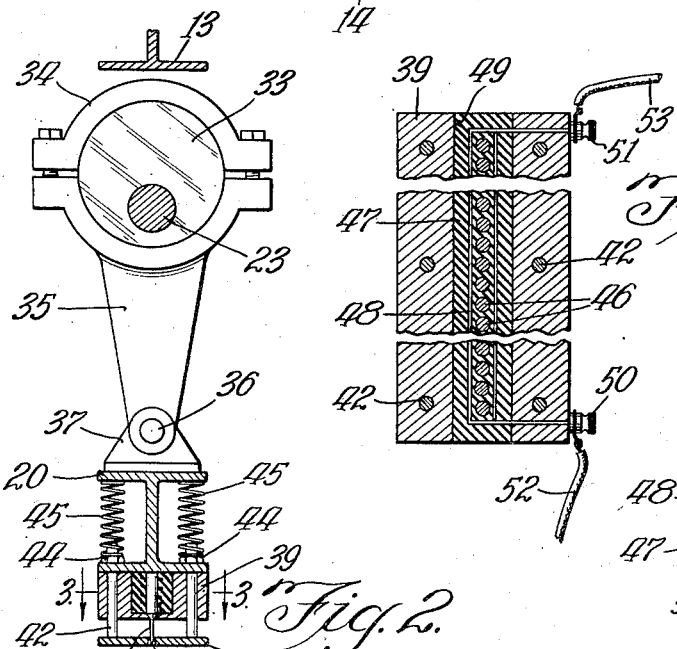
Fig. 2 is an enlarged vertical sectional view taken on the line 2—2 of Fig. 1.

The machine comprises spaced end standards 11 and 12 rigidly connected at their respective upper and lower ends by frame members 13 and 14, and there is also a cross beam 15, which may be of I form as shown, extending between the frame members 11 and 12 and rigidly secured thereto at a suitable elevation to support the work, a die plate 16 being fixedly mounted on the top of this cross beam 15 and having a transversely rounded top surface as shown in Fig. 2 over which the sheet material 17 is fed and by which it is supported in the perforating operation.

Above this die plate 16 is reciprocably mounted the needle carrier indicated as a whole at 18, to which a row of work perforating needles 19 are attached. Said carrier 18 comprises a beam 20, which may be of I form as shown in Fig. 2 and is slidably mounted at its opposite ends on suitable guide rods 21 to move to and from the die plate 16. These guide rods 21 are secured at their lower ends to the beam 15 and at their upper ends to brackets 22 on the standards 11 and 12.

A shaft 23 is journaled above the die plate 16 in bearing brackets 24 hung from the upper frame member 13 and this shaft extends through a bearing 25 in the standard 11 and is provided on its outer end with a large gear 26 in mesh with a pinion 27 on the end of a shaft 28 which extends across the machine and is journaled in the upper ends of the standards 11 and 12. Said shaft 28 has on its other end a combined flywheel and pulley 29 engaged by a belt 30 which is operatively engaged with a pulley 31 of a motor 32 or other convenient source of power by which the shaft 23, through the connections just described, is rotated at a comparatively slow speed.

This shaft 23 has a pair of eccentric disks 33 fixed thereon in spaced relation and each embraced by an eccentric strap 34 of an eccentric rod or arm 35 and the lower ends of these arms 35 are pivotally connected at 36 between pivot lugs 37 on the top of the I-beam 20 of the needle carrier so that in rotation of the shaft 23 the needle carrier 18 and its needles 19 are reciprocated to and from the die plate 16.

The perforating needles 19 are of small diameter so as to make small holes and sharp pointed to penetrate readily without tearing or mutilating the sheet material and are mounted on the carrier 18 in suitable spaced relation according to the spacing of openings desired in the sheet material, and to insure penetration of the needles 19 entirely through the work and also to afford a length of time during which the needles remain in engagement with the perforations, the die block 16 is provided with small openings 38 located directly under the needles 19 to accommodate the needle ends, and the needles are arranged to have a range of reciprocation such that at the end of each down stroke the needle ends engage in the openings 38.

These needles 19 are mounted in a row in spaced relation in a holder 39 which is secured to the under side of the carrier beam 20 and said needles have a stripper plate 40 cooperating therewith which has openings 41 therethrough corresponding to the needles 19 and through which the needles are projected in the perforating operation. This stripper plate is supported by stems 42 which are fixed thereto and extend upwardly through openings in the holder 39 and in the lower flanges 43 of the I-beam 20 and these stems are provided with nuts 44 thereon or other suitable means which engage the flanges 43, the stems 42 being engaged loosely in the openings of the holder 39 and flanges 43 so that the stems are free to move axially thereon. Light coil springs 45 are interposed between the nuts 44 of the stems and the upper flange of the beam 20 to hold the stripper plate normally in the lowermost position substantially at the points of the needles 19 and as the latter are depressed to engage the work on the die block the stripper plate 40 engages the top of the work thereon and is held thereagainst by the compression of the springs 45 while the needles are propelled downwardly through the work and as the needles are elevated the stripper plate remains engaged with the work until the needles are withdrawn therefrom.

Rubber and rubber like materials, especially in the uncured condition, offer a high frictional resistance to penetration by perforating needles and because of the elasticity and tackiness of the rubber, the small holes are likely to close after the needles are withdrawn or the openings may be mutilated or deformed by adherence of the rubber to the needles. Moreover, these tiny openings or pores may be impaired or closed in subsequent handling and processing, especially upon vulcanization of the rubber during which the rubber is softened and becomes plastic and flowable.

To overcome these difficulties in providing such materials with tiny breathing pores or openings, I heat the perforating needles to a suitable temperature so that they not only penetrate and withdraw readily from the rubber and leave openings therethrough which are perfectly formed, but the heat is such to cause an incipient vulcanization of the rubber immediately around the openings or to impart thereto a sufficient set so that the tiny openings are sufficiently permanent to withstand subsequent handling and processing of the material without impairment or closing, care being taken however, to control the heat so that it is not sufficiently high to burn the rubber or fabric.

The needles 19 may be heated in any convenient manner as for example by securing the shanks 46 thereof in a body 47 of heat conductive insulating material in which electrical resistance wire 48 is embedded in proximity to the needle shanks, in which case the needle holder is formed with a cavity 49 in which the body 47 of insulating material is located. Terminals 50 and 51 are provided to which conductors 52 and 53 are connected for supplying current from any suitable source to the resistance 48 for heating the needles 19 and a rheostat 54 or other suitable current controller is provided to regulate the current supply to the resistance 48 so that the needles may be maintained at any desired temperature.

Figure 4:
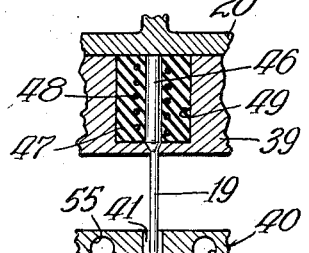
Fig. 4 is an enlarged detail of a portion of the sectional view shown in Fig. 2.

It is desirable to avoid communication of heat to the stripper plate 40 which comes in contact with the work and accordingly the stripper plate openings 41 are made sufficiently larger than the needles 19 as shown in Fig. 4 to avoid contact therewith and provide an air circulation space therebetween for minimizing communication of heat from the needles to the stripper plate. Moreover the stripper plate may be formed at each side of the row of needles with passageways 55 therethrough connected by flexible tubing 56 with a source of circulating cold water or other cooling medium which is circulated through the passageways 55 to keep the stripper plate cool.

For feeding the material to be perforated through the machine a pair of rollers 57 and 58 are rotatably mounted at one side of the I-beam 15 in brackets 59 on said beam and these rollers engage therebetween the material 17 which is led thereto over the die plate 16 from a pair of idler rollers 60 and 61 which are located at the other side of the I-beam 15 and may likewise be rotatably mounted on brackets carried by said I-beam, the material being supplied to the rollers 60 and 61 from any suitable source.

The set of rollers 57 and 58 are arranged to yieldingly engage the material 17 therebetween in any well known manner with sufficient tension to advance the material, the yielding engagement thereof being preferably adjustable to regulate the pressure on the material, and one of these rollers has the shaft 62 thereof extended through a bearing in the standard 11 and provided at its outer end with a ratchet wheel 63 engaged by a ratchet mechanism 64 which in turn is connected by a link 65 with an arm 66 on the needle carrier 18 so that in the upward movement of the needle carrier 18 the shaft 62 and its roller are rotated sufficiently to advance the material 17 over the die plate the desired distance that the succeeding rows of perforations are to be spaced apart. Obviously the advancing movement of the material 17 should not occur until the needles 19 are withdrawn from the material on the die plate 16 and accordingly the ratchet mechanism 64 has sufficient lost motion or delayed action on the uprising stroke of the needle carrier so that the needles 19 are disengaged from the material 17 before the advancing movement of the material begins.

The idler rollers 60 and 61 likewise are arranged to engage the material 17 with a yielding tension which is preferably adjustable to avoid any undue pressure on the material, minimum tension of these rollers 60 and 61 as well as of the other rollers 57 and 58 being especially desirable in the case of embossed or pattern surfaced material 17 to avoid any impairment of the embossing or pattern surface.

The material to be perforated may be sheet rubber, fabric coated or laminated with rubber or other desired material, a composite sheet of rubber 67 with attached fabric 68 lamination being shown herein for purposes of illustration and the exposed surface of the rubber lamination 67 may have a design or pattern embossed thereon.

In the operation of the device and in accordance with the method hereof, this material is fed between the rollers 60 and 61 over the die plate 16 and between the rollers 57 and 58 which latter rollers, in each uplifting stroke of the needle carrier 20, advance the material across the die plate a predetermined distance.

The rheostat 54 is adjusted to regulate the supply of current to the heating element 48 so that the needles 19 are maintained at the proper temperature to penetrate through and withdraw readily from the rubber laminated material 17 and also so that the heat of the needles is sufficient to cause a slight incipient vulcanization of the uncured rubber of the lamination 67 immediately around the perforation, the extent of projection of the needles 19 through the material 17 into the die plate openings 38 being such to insure openings clear through the material and duration of engagement of the needles with the openings to communicate sufficient heat to the rubber for this purpose, and it is to be noted that the needles penetrate straight through the material at right angles to the surface thereof.

Upon each down stroke of the needle carrier the heated needles penetrate clear through the sheet material 17 thereby softening and spreading the rubber 67 at the perforation to form the openings 69, a row of which are made across the width of the sheet, and as the needles are sharp pointed they penetrate the fabric 68 without mutilation thereof, the fabric threads being merely spread apart by the needles to form the openings therethrough. At the same time the heat of the needles 19 imparts to the softened rubber immediately around the openings 69 an incipient vulcanization to an extent sufficient to form a sort of thin ferrule 70 of semi-set rubber which imparts sufficient permanence to the openings 69 so that they are preserved throughout subsequent handling and processing of the material. Moreover the softened and semi-set rubber around the openings 69 is at the same time combined sufficiently with the spread apart threads of the fabric at the openings to preserve the openings through the fabric so that in the final product fine openings or breathing pores entirely through the composite material are assured.

In the downward stroke of the needle carrier, the stripper plate 40 is engaged against the top of the material 17 and remains engaged therewith while the needles 19 penetrate through and are withdrawn from the material 17, the springs 45 yielding at the time to permit the needles to be projected downwardly through the stripper plate and holding the stripper plate against the material 17 until the needles are withdrawn therefrom.

This stripper plate is kept cool, by water circulation through the passageways 55 if necessary so that it can have no softening effect on the rubber of the material 17 while in contact therewith and moreover the springs 45 are preferably arranged to impose a sufficiently light resistance to upward movement of the stripper plate so that the stripper plate pressure on the material 17 is such, especially when the latter has an embossed or patterned surface, that the material 17 or pattern surface thereof is not impaired by the stripper plate pressure.

It will be understood from the above that the sheet material 17 is not heated generally in the perforating operation but that as the needles only are heated there are merely isolated applications of heat to the material locally at the places where the perforations are made.

It will be noted in Fig. 2, that the direction of the material 17 in its travel to and from the stripper plate is approximately tangential thereto so that the material 17 contacts with the stripper plate only at the top hereof, and in order to avoid any pressure against the material 17 at the places where the openings 69 are formed the die plate 16 preferably has a transverse groove 71 (see Fig. 5) across the top thereof at each place where the openings 38 are formed and the rollers 57 and 58 are also preferably provided with circumferential grooves 72 in alignment with the grooves 71 of the stripper plate 16 so as to eliminate direct pressure on the material 17 at the places where the openings 69 are formed and thereby contribute to the preservation of the openings against impairment which might otherwise be caused by wiping movement of the margins of the openings 69 against the die plate 16 or pressure immediately at such margins against the material, especially while the rubber is in a softened condition from the heat of the needles 19.

Figure 3:
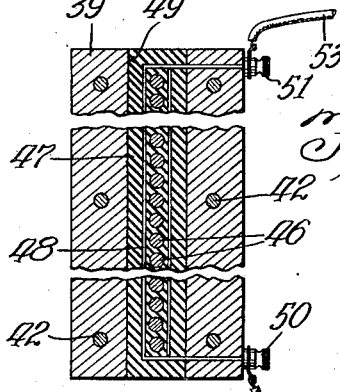
Fig. 3 is an enlarged horizontal sectional view on the line 3—3 of Fig. 2.

Instead of employing a resistance embedded in insulating material as in Figs. 2, 3 and 4, for heating the needles, headed needles as shown at 73 in Fig. 8 may be employed which are engaged through openings 74 in a strip 75 of insulation with another strip 76 of insulating material covering the heads 77 of the needles and clamped thereagainst.

Short segments 78 of electrical resistance material are interposed between adjoining needles and extend under the needle heads 77 and end segments 79 and 80 are also provided, the inner ends of which extend under the heads 77 of the respective end needles 73, and the clamping engagement of the insulating strip 76 against the needle heads holds them in contact with the segments 78, 79 and 80. The end segments 79 and 80 have terminals connected to conductors 81 and 82 which lead to a source of electric current, the supply of which to the series of resistance segments 78, 79 and 80 may be controlled by a rheostat 83 to regulate the temperature of the needles. Obviously instead of employing the separate segments 78, 79 and 80 a continuous strip of electrical resistance material may be employed and merely provided with openings through which the needles 73 extend with the needle heads 77 clamped by the insulating strip 76 against the said strip.

With the above segment or strip electric resistance heating the needles, which are of electrical conducting material, are necessarily in electrical conducting relation to the heating segments or strip, and the die plate 16 should be made of electrical insulating material or if preferred the openings thereof may be insulated as shown in Fig. 8 by ferrules 84 of insulating material. Likewise the stripper plate 40 may be made of insulating material or have the holes 41 thereof similarly insulated, although this is not so essential because of the fact that the holes 41 of the stripper plate are sufficiently larger than the needles 19 so that they do not contact therewith.

A timing device may also be employed with either electrical needle heating means to heat the needles at intervals which may be arranged to occur in a desired timed relation with the penetration of the material 17 by the needles. Such an intermittent heating device is shown somewhat diagrammatically in Fig. 8 and comprises a rotary disk 85 of insulating material having a conductor segment 86 on the periphery thereof with which a brush 87 is arranged to make contact during a certain period of each revolution of the disk 85. This disk 85 may be mounted on the eccentric shaft 23 or operated from the eccentric shaft as for example through a belt 88 which engages a pulley 89 on the shaft 23 and a pulley 90 of the same size on the shaft of the disk 85 so that the latter rotates at the same speed as the eccentric shaft 23 and the segment 86 is accordingly in contact with the brush 87 during a certain period of each revolution of the eccentric shaft. One of the conductors through which current is supplied to the eletrical resistance which heats the necdies leads through the segment and brush interrupter, for example the conductor 82 from a terminal of the resistance leads to the segment 86 and the conductor 81 leads from the brush 87 to the source of electrical supply and with these connections current is supplied to the needle heating resistance only during the time that the brush 87 is in contact with the segment 86.

Any other convenient means of heating the needles may be employed, as for example a gas supply pipe 92 may be secured by clamps 93 to the under side of the needle holder 40 so that it extends along the row of needles and said pipe 92 may have an orifice 94 opposite each needle 95 to produce an individual gas flame 96 directed against the respective needle. The needle holder 97 of course, in such case does not have the cavity 49 of Fig. 4 nor the electrical insulation thereof, but instead the shanks 98 of the needles are secured directly in openings 99 provided therefor in the holder 97 as shown in Fig. 9.

The needles 19 may be arranged to effect the advancing movement of the material 17, instead of employing rolls 57 and 58 for this purpose, in which case the group of needles 19 have, in addition to their vertical reciprocatory movement, a reciprocating movement in the direction of travel of the material 17 of an extent sufficient to advance the material for each successive row of perforations. In such case, instead of using round needles 19, the needles may be of oval cross section as shown at 100 in Fig. 11 with the major axis thereof transverse to the direction (indicated by the arrow 101) in which the material 17 is moved by the needles. The needles 100 necessarily exert a pull on the material 17 to advance same and as this may tend to distort the opening and increase the transverse width thereof in the direction of pull of the needles the employment of oval needles 100 causes the resultant openings to have a substantially round form as shown at 102 in Fig. 11.

Although the present invention is especially adapted to provide materials of or involving uncured rubber or the like with tiny openings or breathing pores, and is especially advantageous for that purpose, it may however be employed advantageously to perforate rubber that is already cured or to perforate fabric with coatings or laminations other than rubber. While I have shown and described my invention in a preferred form, I am aware that various changes and modifications may be made without departing from the principles of my invention, the scope of which is to be determined by the appended claims.

I claim as my invention:

1. The method of making foraminous sheet material, which comprises providing sheet material composed at least partly of rubber or the like, then forming perforations through the sheet material and simultaneously subjecting said perforation places to isolated applications of heat in a manner to locally soften and preserve the material at the places where the perforations are made.

2. The method of making foraminous sheet material, which comprises providing sheet material composed at least partly of rubber or the like, then forming perforations through the sheet material and simultaneously subjecting said perforation places momentarily to isolated applications of heat in a manner to locally soften and preserve the material at the places where the perforations are made.

3. The method of making foraminous sheet material, which comprises providing sheet material composed at least partly of rubber or the like, inserting spaced heated sharp pointed needles through a generally unheated area of the sheet and withdrawing the needles therefrom before the area is heated generally.

4. The method of making foraminous sheet material, which comprises providing sheet material composed at least partly of rubber or the like, inserting spaced heated needles through the sheet material to form perforations therethrough, and supplying a cooling medium to the vicinity of the perforations to localize the heat at the perforations.

5. The method of making foraminous material, which comprises providing sheet material composed at least partly of uncured rubber or the like, and forming perforations through the sheet material and simultaneously preservatively conditioning the rubber locally at the perforations.

6. The method of making foraminous material, which comprises providing sheet material composed at least partly of uncured rubber or the like, and forming perforations through the sheet material and simultaneously imparting locally to the rubber at the perforations a partial cure, and thereafter subjecting the rest of the sheet to a curing operation.

7. The method of making foraminous sheet material, which comprises providing sheet material composed at least partly of rubber or the like, inserting spaced needles through the sheet material and heating the needles intermittently in selected timed relation with the insertion thereof.

8. In a perforating device of the class described, the combination of a work support, a group of needles reciprocable to and from the support to perforate material thereon, heating means for the needles, and a controller for regulating the temperature of the needles.

9. In a perforating device of the class described, the combination of a work support, a plurality of heated needles operable to and from the support to perforate material thereon, and means adjacent the perforating zone constructed and arranged to localize the heat of the needles at the places where the needles perforate the work on the work support, said means including facilities through which a cooling medium is circulated in proximate spaced relation to the perforating zone.

10. In a perforating device of the class described, the combination of a work support, a plurality of heated needles operable to and from the support to perforate material thereon, and a pair of rollers operable for advancing the work across the support after each perforating operation of the needles, said support and one of the rollers having grooves in the planes of the needles.

FRANK JERMAIN CHANDLER.